United States Patent [19]

Pearson

[11] 4,199,203
[45] Apr. 22, 1980

[54] OUTER RACE RING CENTERED RETAINER FOR ROLLING BEARINGS

[75] Inventor: Torgny Pearson, Västra Frölunda, Sweden

[73] Assignee: SKF Nova AB, Gothenburg, Sweden

[21] Appl. No.: 948,495

[22] Filed: Oct. 4, 1978

[30] Foreign Application Priority Data

Oct. 18, 1977 [SE] Sweden ............................. 7711705

[51] Int. Cl.² .................... F16C 33/66; F16C 19/28
[52] U.S. Cl. .................................. 308/213; 308/187; 308/214; 308/217
[58] Field of Search ............... 308/211, 212, 213, 214, 308/216, 217, 218, 187; 29/148.4 A, 148.4 C

[56] References Cited

U.S. PATENT DOCUMENTS

| 2,029,265 | 1/1936 | Kylen | 308/212 |
| 3,022,125 | 2/1962 | Bratt et al. | 308/213 |
| 3,940,191 | 2/1976 | Tomioka et al. | 308/214 |

FOREIGN PATENT DOCUMENTS 853238  11/1960  United Kingdom ................. 308/217

Primary Examiner—Charles E. Frankfort
Attorney, Agent, or Firm—Eugene E. Renz, Jr.

[57] ABSTRACT

A centering ring for a rolling bearing assembly comprising an outer ring, an inner ring and at least two rows of rolling elements in the annular space between the rings and a retainer having pockets for the rolling elements. The centering ring is of T-shaped cross section and preferably made of sheet metal and the outer surface of the bar of the T conforms to the shape of the outer raceway and the vertical leg of the T is connected to the retainer. The centering ring may also be provided with grooves or be knurled to retain lubricant and the inner face of the T-shaped bar is preferably conical and outwardly divergent from the vertical leg to aid in the distribution of lubricant to the rolling elements.

3 Claims, 1 Drawing Figure

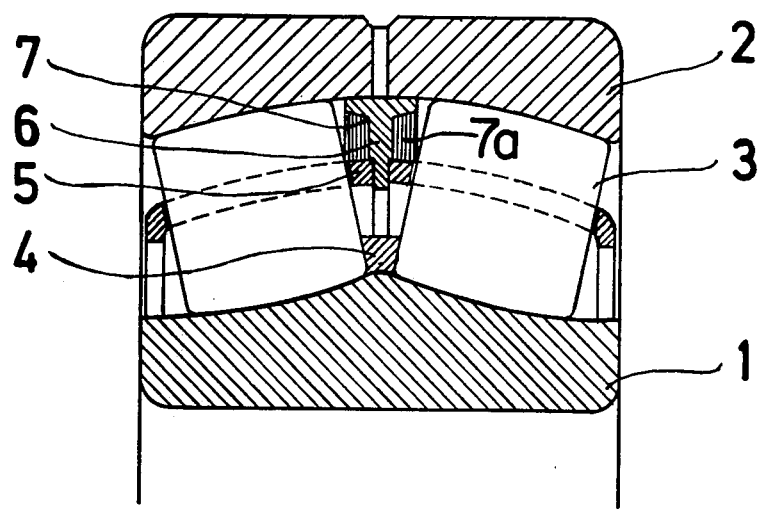

OUTER RACE RING CENTERED RETAINER FOR ROLLING BEARINGS

BACKGROUND OF THE INVENTION

The present invention relates to retainers for rolling bearings, wherein the retainer is centered by means of a ring, which is fixedly connected to the retainer and is centered on the outer race ring of the bearing.

For different reasons it is necessary to center the retainer of a bearing. This is particularly important in such bearings where large centrifugal forces will arise and where the bearing is subjected to intense vibrations, such as for instance in bearings for a shaking sieve.

It is earlier known to center the retainer and an example of such a centering is described in Swedish Pat. No. 173973. This patent describes a retainer, which is fixedly connected to a ring which centers the retainer against the outer race ring. This centering ring is homogeneous and its cross sectional shape is that of a equilateral trapezoid. The ring described in the patent centers the retainer well but it has a drawback that it is unnecessarily heavy and it has no ability of retaining lubricant.

Due to the weight of the ring the pressure against the outer race ring will be large, which results in unnecessarily high friction and temperature.

SUMMARY OF THE INVENTION

It has therefore been desired to provide a centering ring, which does not suffer from the disadvantages of the known ring and this has according to the invention been accomplished by providing a retainer, which characterized thereby that the cross section of the centering ring, which is fixedly connected to the retainer, is substantially T-shaped.

The centering ring according to the present invention is preferably made of sheet metal, but it is also possible to use other materials.

If the centering ring is made from sheet metal it is preferable that it is manufactured by cold rolling.

As the cross section of the centering ring is T-shaped two inner corners are formed, in which grease easily is stored and from which it is gradually delivered by means of centrifugal force to the race of the outer race ring. To improve the retention of the grease it is preferable to knurl or provide these corners with grooves in which the lubricant can be collected.

DESCRIPTION OF THE DRAWING

The invention will hereinafter be further described with reference to the accompanying drawing, which shows a section through a double-row spherical roller bearing.

In the drawing the bearing race ring is denoted 1 and the outer race ring 2. Between these race rings there is in known manner provided rollers 3, having shperical envelope surfaces. The rollers are guided by a guiding ring 4. A retainer 5, which can be of different types, is in a known manner arranged around the rollers. According to the invention this retainer is centered by means of a centering ring 6, which has a cross sectional shape of a T, as can be clearly seen in the drawing. At the inner corners of the centering ring there is easily collected grease and these corners can therefore preferably be knurled or provided with grooves 7a in any manner, whereby the grease will be more easily retained and it will thereupon during operation slowly be delivered to the outer race ring of the bearing. Also as illustrated the outer surface of the bar of the T is arcuate and conforms to the surface of the outer raceway. Moreover the inner surface of the bar is conical and outwardly divergent from the vertical leg of the T as illustrated in order to direct the lubricant to the area of contact between the rollers and the outer raceway.

The advantage of the centering ring according to the present invention is that it compared to the previously known ring will have a very low weight and will give the bearing very good lubricating properties, which will result in an even and low operation temperature.

Due to the material saving and the possibility directly to cold roll the finished ring the manufacturing cost for this will be much lower than those for the known ring. The cost for the centering ring according to the invention can be estimated to at most 50% of the cost for the manufacture of the known ring.

The invention is described in connection to a double-row spherical roller bearing but it can of course be applied to other types of bearing, e.g. tapered and cylindrical bearings. The invention is therefore not limited to the embodiment shown but it can in different manners be modified within the scope of the appended claims.

I claim:

1. A centering ring for a rolling bearing assembly comprising an outer ring, an inner ring and at least two rows of rolling elements in the annular space between the said inner and outer rings, a retainer having a plurality of circumferentially spaced pockets for the rolling elements, said centering ring being made of sheet metal and of T-shaped cross section, the outer surface of the bar of the T conforming to the shape of the outer raceway and the vertical leg of the T connected to the retainer, the inner surfaces of the bar of the T on either side of the vertical leg being conical and diverging outwardly from the vertical leg to direct lubricant to the area between the rolling elements and outer raceway.

2. An outer race ring centered retainer according to claim 1 wherein the inner corners of the centering ring are provided with grooves for retention of lubricant.

3. An outer race ring centered retainer according to claim 1, characterized thereby, that the centering ring (6) is made by cold rolling.

* * * * *